US009415474B2

(12) United States Patent
Lee et al.

(10) Patent No.: US 9,415,474 B2
(45) Date of Patent: Aug. 16, 2016

(54) SPINDLE JIG AND AUTO PALLET-CHANGEABLE MACHINING CENTER HAVING THE SAME

(71) Applicant: Hyundai Motor Company, Seoul (KR)

(72) Inventors: Nam-Doo Lee, Ulsan (KR); Joo-OK Park, Ulsan (KR); Heedong Son, Ulsan (KR)

(73) Assignee: Hyundai Motor Company, Seoul (KR)

( * ) Notice: Subject to any disclaimer, the term of this patent is extended or adjusted under 35 U.S.C. 154(b) by 319 days.

(21) Appl. No.: 14/097,901

(22) Filed: Dec. 5, 2013

(65) Prior Publication Data

US 2014/0169902 A1 Jun. 19, 2014

(30) Foreign Application Priority Data

Dec. 17, 2012 (KR) .......................... 10-2012-0147821

(51) Int. Cl.
*B23Q 1/70* (2006.01)
*B23Q 11/00* (2006.01)
*B23Q 1/66* (2006.01)

(52) U.S. Cl.
CPC *B23Q 11/00* (2013.01); *B23Q 1/66* (2013.01); *B23Q 1/70* (2013.01); *Y10T 29/5196* (2015.01); *Y10T 409/30392* (2015.01); *Y10T 409/309296* (2015.01); *Y10T 409/309408* (2015.01)

(58) Field of Classification Search
CPC .......... B23Q 1/66; B23Q 1/70; B23Q 7/1426; B23Q 7/1431; Y10T 29/5124; Y10T 29/5196; Y10T 409/30392; Y10T 409/30448; Y10T 409/309296; Y10T 409/309352; Y10T 409/309408
USPC ........... 29/33 P, 563; 409/134, 144, 230, 231, 409/232
See application file for complete search history.

(56) References Cited

U.S. PATENT DOCUMENTS

| 3,239,076 | A | * | 3/1966 | Huff | ...................... B23P 19/024 254/29 R |
| 4,944,638 | A | * | 7/1990 | Brohammer | .......... B23B 39/162 408/124 |
| 6,083,145 | A | * | 7/2000 | Azema | ...................... B66C 1/24 29/726.5 |
| 7,165,302 | B2 | * | 1/2007 | Kikkawa | .............. B23Q 1/0018 29/426.1 |

FOREIGN PATENT DOCUMENTS

KR 2001-0049593 A 6/2001
KR 20-2012-0006281 U 9/2012

* cited by examiner

*Primary Examiner* — Sunil K Singh
*Assistant Examiner* — Michael Vitale
(74) *Attorney, Agent, or Firm* — Morgan, Lewis & Bockius LLP

(57) ABSTRACT

A spindle jig and a machining center having the same are disclosed. The machining center includes a spindle jig installed to be movable, a guide rail mounted to guide and move the spindle jig, a spindle that is fitted and supported on the spindle jig, and is equipped with a processing tool and rotates the processing tool, a column on which the spindle jig is mounted, an auto pallet changer equipped with materials, and transferring the materials to a processing area or a non-processing area, a splash guard rotated integrally with the auto pallet exchanger, mounted to be tiltable at a predetermined angle and separating the processing area from the non-processing area, and an upper cover installed to be rotatable on the movement path of the spindle jig along the guide rail. Accordingly, the replacement of the spindle can be quick and easy.

13 Claims, 20 Drawing Sheets

SPINDLE JIG AND AUTO PALLET-CHANGEABLE MACHINING CENTER HAVING THE SAME

CROSS-REFERENCE TO RELATED APPLICATION

The present application claims priority of Korean Patent Application Number 10-2012-0147821 filed Dec. 17, 2012, the entire contents of which application are incorporated herein for all purposes by this reference.

BACKGROUND OF INVENTION

1. Field of Invention

The present invention relates to a spindle jig and an auto pallet-changeable machining center having the same, and more particularly, to a spindle jig, which allows for stable, quick and easy spindle replacement for removing the spindle from the column and transferring it or mounting a new spindle on the column, and an auto pallet-changeable machining center having the same.

2. Description of Related Art

In general, a machine tool employs an auto pallet changer (APC) to realize automation, which is capable of mounting a work piece on a pallet, transferring it to a processing area, mounting the work piece processed in the process zone on the pallet, and taking the work piece to a non-processing area.

FIG. 1 shows a machining center with the above-mentioned auto pallet changer mounted thereon. The machining center 10 is in the shape of a substantially rectangular block, and includes a cover 12 for protecting it from the external environments. The cover 12 has a door or safety device installed thereon.

An auto tool changer (ATC) equipped with a plurality of processing tools is mounted on an opened top portion where the cover 12 is open, so that the tools are automatically changed, as required according to processes, by the ATC.

Referring to FIG. 2 in which the cover 12 has been removed, the machining center 10 includes a lower bed 14 for supporting loads and cutting loads.

A Z-axis runs along the lower bed 14 in the lengthwise direction of the machining center, and a cross table 16 and a column 18 are installed to be movable back and forth along the Z-axis. The cross table 16 functions to support cutting loads when processing materials.

An X-axis runs along the cross table 16 in the widthwise direction of the machining center, and the column 18 is installed to be movable left and right along the X-axis depending on processing positions of materials. The column 18 functions to support cutting loads when processing materials.

A Y-axis runs along the column 18 in the height direction of the machining center, and a spindle 20 is installed to be movable up and down along the Y-axis depending on processing positions of materials. The spindle 20 is equipped with a processing tool for processing materials, and rotates the processing tool.

An auto pallet changer (APC) is installed on the lower bed 14 to mount two different types of materials. The APC functions to alternately rotate two different types of materials at 180 degrees and place them on the processing area.

An index table 22 is rotatably installed on the APC. The index table 22 functions to place materials 26a and 26b and jigs 24a and 24b at desired processing positions. The jigs 24a and 24b are installed in twos on the index table 22, and function to fix the materials 26a and 26b to be processed.

In FIG. 2, the first material 26a is mounted on the jig 24a positioned in the loading side, and the second material 26b is mounted on the jig 24b positioned in the machining side.

A splash guard 28 disposed to intersect between the two jigs 24a and 24b functions as a kind of cover for separating the processing area and the non-processing area, and is installed to rotate in line with the rotation of the APC.

In order to replace the spindle 20 or its related parts, the thus-configured conventional machining center requires a workspace for spindle replacement where the spindle 20 can be removed from the column 18 and a new spindle can be mounted thereon.

The workspace for spindle replacement can be obtained only in the lengthwise direction of the machining center because of the peripheral parts of the spindle and the cover 12, and it is necessary to dissemble the splash guard 28 from the APC first, because the splash guard 28 stands in the way of the lengthwise direction of the machining center.

After dissembling the splash guard 28, additional removal equipment needs to be installed to remove the spindle 20. Thus, it takes much time to do the spindle replacement requiring the removal and mounting of the spindle, and it is not easy to do the replacement.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a spindle jig, which reduces the time for spindle replacement requiring the removal, transfer, and mounting of the spindle and allows for quick and easy spindle replacement, and an auto pallet-changeable machining center having the same.

Various aspects of the present invention provide a spindle jig including jig frames disposed substantially parallel to each other; jig brackets connecting both edges of the jig frames; a hook bracket that integrally connects the jig frames at a center portion along the lengthwise direction of the jig frames and extends from the jig frames; rollers installed at both left and right edges of the jig frames; and hooks detachably installed on the hook bracket for placing and supporting a spindle.

The hooks may include first and second hooks. The first hook may include a first upper hook, an upper part thereof is detachably mounted on the hook bracket, and a lower part thereof has a substantially semicircular arc-shaped fitting portion, and a first lower hook, which has a substantially semicircular arc shape and forms a substantially arc-shape together with the substantially semicircular arc-shaped fitting portion of the first upper hook, and is detachably coupled to the first upper hook. The second hook may include a second upper hook, an upper part thereof is detachably mounted on the hook bracket, and a lower part thereof has a substantially semicircular arc-shaped fitting portion, and a second lower hook, which has a substantially semicircular arc shape and forms a substantially arc-shape together with the substantially semicircular arc-shaped fitting portion of the second upper hook, and is detachably coupled to the second upper hook.

An assembly pin may be installed to penetrate the first and second upper hooks, and assembly holes may be formed in the hook bracket that penetrates the hook bracket for inserting and holding the assembly pin.

Various other aspects of the present invention provide a machining center including the spindle jig, a guide rail mounted to guide and move the spindle jig, a spindle that is fitted and supported on the spindle jig, and is equipped with a processing tool and rotates the processing tool, a column on which the spindle jig is mounted, an auto pallet changer equipped with materials, and transferring the materials to a processing area or a non-processing area; a splash guard that is rotated integrally with the auto pallet exchanger, mounted to be tiltable at a predetermined angle, and separates the processing area and the non-processing area, and an upper cover installed to be rotatable on the movement path of the spindle jig along the guide rail.

The guide rail may include a cutting oil pipe for supplying a cutting oil when processing the materials by the spindle.

The splash guard may include a lower splash guard mounted on the auto pallet changer; and an upper splash guard tiltably connected to the lower splash guard. The bottom of the upper splash guard may be tiltably connected to the top of the lower splash guard by a hinge bracket and a hinge pin.

A stopper edge may be formed on the bottom of the upper splash guard, and a horizontal stopper surface may be formed on the top of the lower splash guard to prevent further tilting of the upper splash guard when the horizontal stopper surface contacts the stopper edge.

Support brackets for supporting the cutting oil pipe may be installed. The upper cover may include a vertical cover rotatably installed at the support brackets by a hinge shaft, and a horizontal cover bent and extended substantially at a right angle to the vertical cover.

According to various aspects of the present invention, a spindle jig and an auto pallet-changeable machining center allow for quick and easy removal of the spindle and its related parts because the spindle can be stably supported by the spindle jig when removing the spindle mounted on the column and its related parts from the column.

After the removed spindle and its related parts are transferred to the outside of the machining center by using the spindle jig and replaced with new ones, the new spindle and its related parts can be transferred and mounted onto the column. Therefore, the removal and mounting of the spindle and its related parts can be made quick and stable.

Moreover, the splash guard only needs to be tilted without being removed from the machining center, in order to secure a workspace for replacement of the spindle and its related parts. As a result, the time for replacement can be reduced, and work productivity and stability can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 10 shows the outer appearance of an exemplary machining center before mounting of an exemplary spindle jig according to the present invention.

FIG. 11 shows the outer appearance of the machining center of FIG. 10 from which the front cover is removed.

FIG. 12 shows the outer appearance of the machining center of FIG. 11 which is equipped with an exemplary spindle jig.

FIG. 13 illustrates an exemplary auto pallet changer which is lifted when an exemplary spindle jig is installed according to the present invention.

FIG. 14 illustrates the auto pallet changer of FIG. 13 which is rotated at 90 degrees.

FIG. 15 illustrates the upper cover of FIG. 14 which is rotated at 90 degrees.

FIG. 16 illustrates the splash guard of FIG. 15 which is tilted.

FIG. 17 illustrates the spindle jig of FIG. 16 which is transferred to the spindle.

FIG. 18 is a side view of a spindle which is mounted and supported on an exemplary spindle jig according to the present invention.

FIG. 19 is a side view of a spindle which is mounted by an exemplary spindle jig and transferred forward of the machining center along the lengthwise axis of the machining center according to the present invention.

FIG. 20 is a perspective view of a spindle which is mounted by an exemplary spindle jig and transferred forward of the machining center along the lengthwise axis of the machining center according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
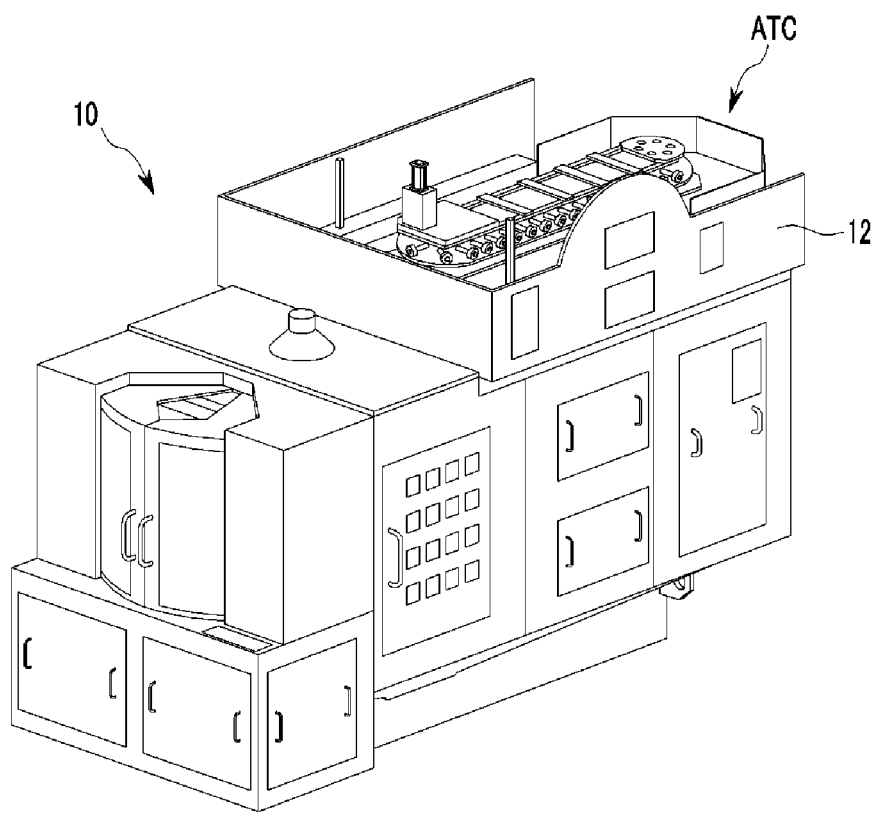
FIG. 1 is a perspective view of an auto pallet-changeable machining center according to the conventional art.
Figure 2:
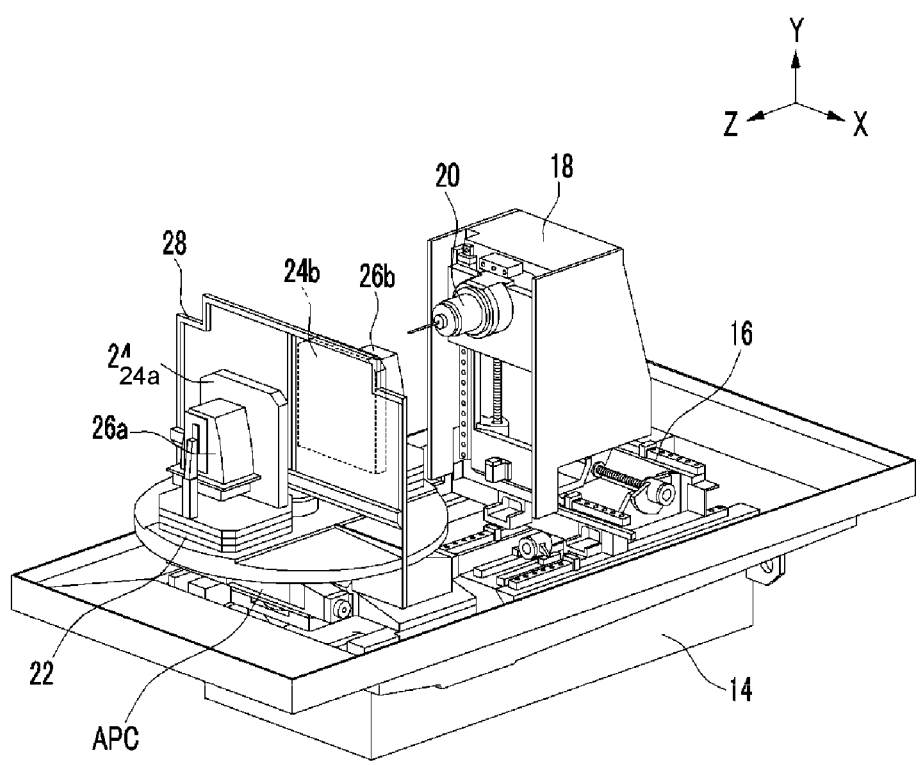
FIG. 2 is a perspective view of the auto pallet-changeable machining center according to the conventional art from which a cover is removed.
Figure 3:
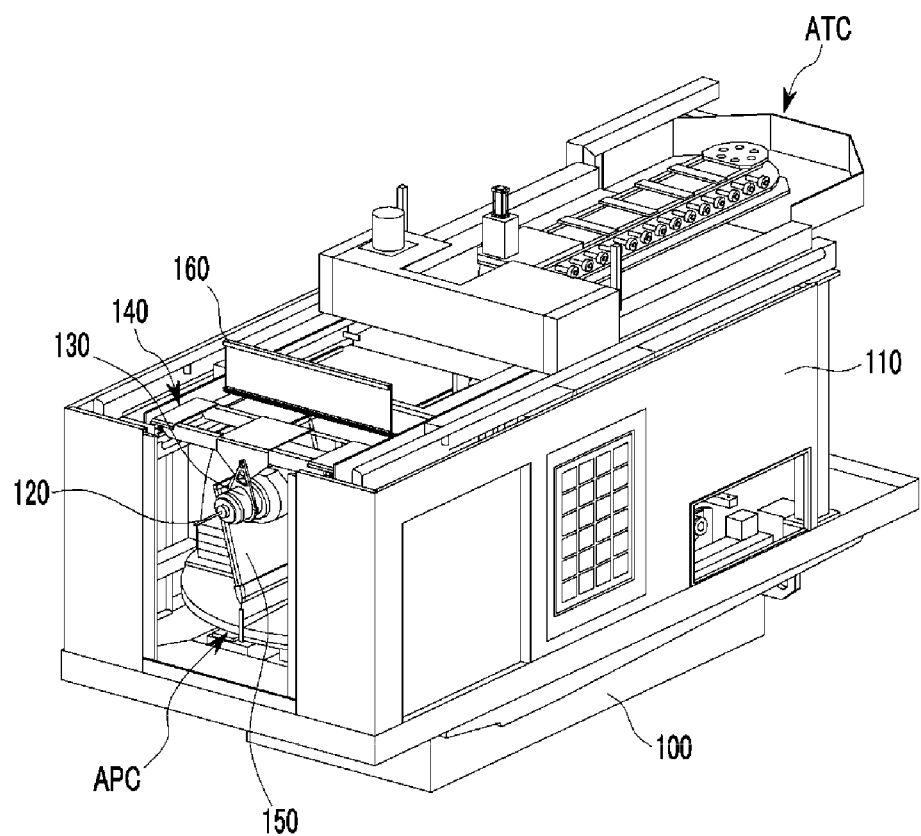
FIG. 3 is a perspective view of an exemplary machining center equipped with a spindle jig according to the present invention.

Referring to FIG. 3, a machining center according to various embodiments of the present invention includes a lower bed 100 supporting the overall load, an auto pallet changer (APC) mounted on the lower bed 100, and a cover 110 installed on the lower bed 100 and covering the APC, etc from the outside.

Further, the machining center includes an auto tool changer (ATC) disposed on the top, equipped with a plurality of processing tools, and capable of automatically changing the tools, as required according to processes, and a spindle 130 that rotates a tool 120, such as a drill, for processing materials.

The spindle 130 is installed to be removable from the machining center or mountable on the machining center as required. Thus, a spindle jig 140 according to various embodiments of the present invention is installed to facilitate the removal and mounting of the spindle 130.

FIG. 3 illustrates that the spindle 130 is removed and movably supported on the spindle jig 140. To secure a workspace for the removal and mounting of the spindle 130, the splash guard 150 and an upper cover 160 are rotatably installed.

The splash guard 150 functions to separate a processing area and a non-processing area within the machining center, and the upper cover 160 functions to cover the interior of the machining center from the top.

Figure 4:
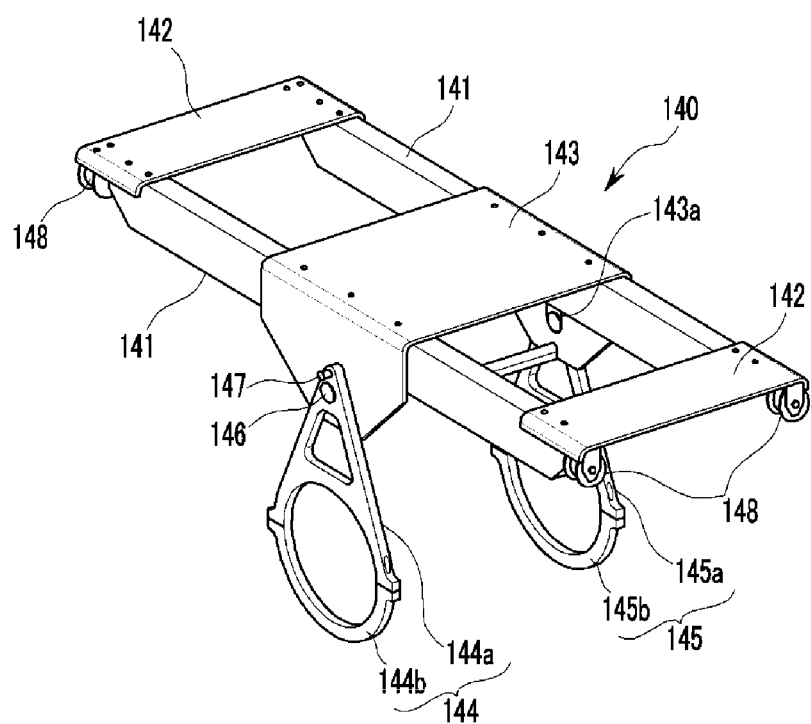
FIG. 4 is a perspective view of an exemplary spindle jig according to the present invention.

Referring to FIG. 4, the spindle jig 140 includes two jig frames 141 disposed substantially parallel to each other, jig brackets 142 connecting both edges of the two jig frames 141, and a hook bracket 143 that integrally connects the two jig frames 141 at a center portion along the lengthwise direction of the two jig frames 141 and extends from the two jig frames 141.

The hook bracket 143 has first and second hooks 144 and 145 detachably installed therein, on which the spindle 130 can be fitted and supported.

The first hook 144 includes a first upper hook 144a, whose upper part is detachably mounted on the hook bracket 143, and whose lower part has a substantially semicircular arc-shaped fitting portion, and a first lower hook 144b, which has a substantially semicircular arc shape and forms an substantially arc-shape together with the substantially semicircular arc-shaped fitting portion of the first upper hook 144a, and which is detachably coupled to the first upper hook 144a.

The second hook 145 includes a second upper hook 145a, whose upper part is detachably mounted on the hook bracket 143, and whose lower part has a substantially semicircular arc-shaped fitting portion, and a second lower hook 145b, which has a substantially semicircular arc shape and forms an arc-shape together with the substantially semicircular arc-shaped fitting portion of the second upper hook 145a, and which is detachably coupled to the second upper hook 145a.

One would appreciate that the first and second hook can take various other similar or suitable configurations, include shapes and sizes.

An assembly pin 146 is installed to penetrate the first and second upper hooks 144a and 145a, and assembly holes such as elliptical assembly holes 143a are formed to penetrate the hook bracket 143 or in the hook bracket 143 so that the assembly pin 146 is inserted and held therein.

Moreover, an assembly bolt 147 engages with the first and second upper hooks 144a and 145a and the hook bracket 143 by penetrating them.

Rollers 148 are rotatably installed at both left and right edges of the two jig frames 141 so as to make the rolling movement of the spindle jig 140 easy.

Figure 5:
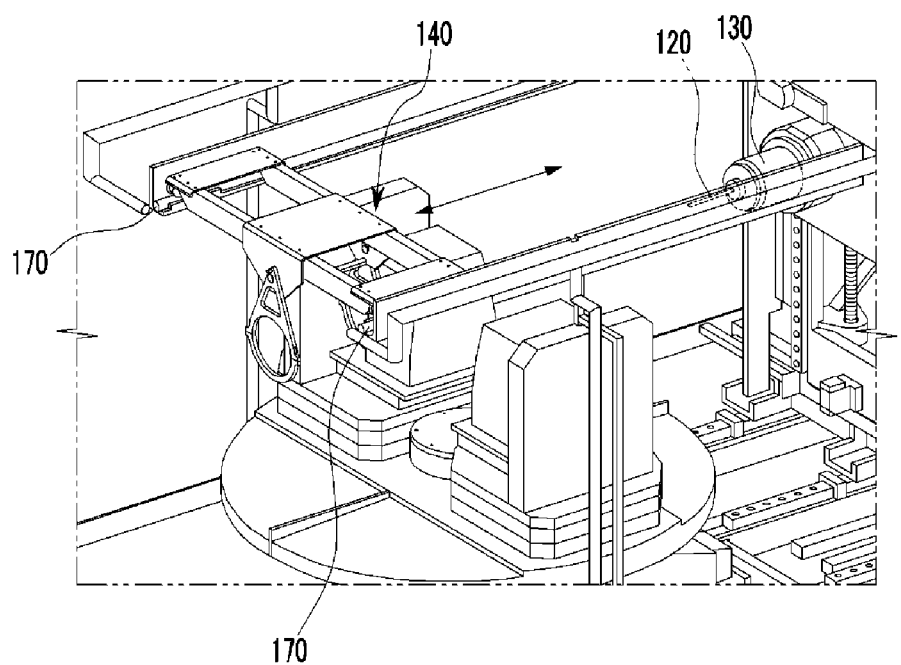
FIG. 5 is a partial enlarged perspective view of an exemplary machining center equipped with a spindle jig according to the present invention.

Referring to FIG. 5, a cutting oil pipe 170 for cooling and lubricating a processing tool during processing of materials is installed at upper parts of both left and right sides of the machining center to extend longitudinally, and the spindle jig 140 is placed over the cutting oil pipe 170 so as to be movable in the lengthwise direction of the machining center along the cutting oil pipe 170 by means of the rollers 148. That is, the cutting oil pipe functions as a guide rail of the spindle jig 140.

Figure 6:
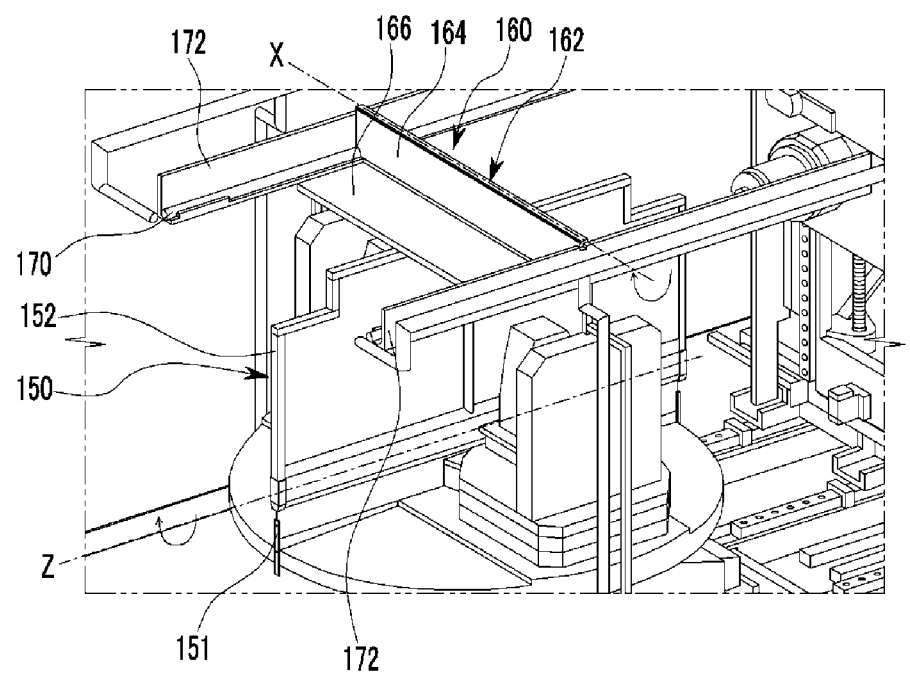
FIG. 6 is a partial enlarged perspective view of an exemplary machining center equipped with a splash guard and an upper cover according to the present invention.

Referring to FIG. 6, to secure a workspace for replacement of the spindle 130, the splash guard 150 is installed to be rotatable on the Z-axis (length) of the machining center, and the upper cover 160 is installed to be rotatable on the X-axis (width) of the machining center.

The splash guard 150 includes a lower splash guard 151 mounted on the APC and an upper splash guard 152 connected to the lower splash guard 151 so as to be tiltable on the Z-axis.

Figure 7:
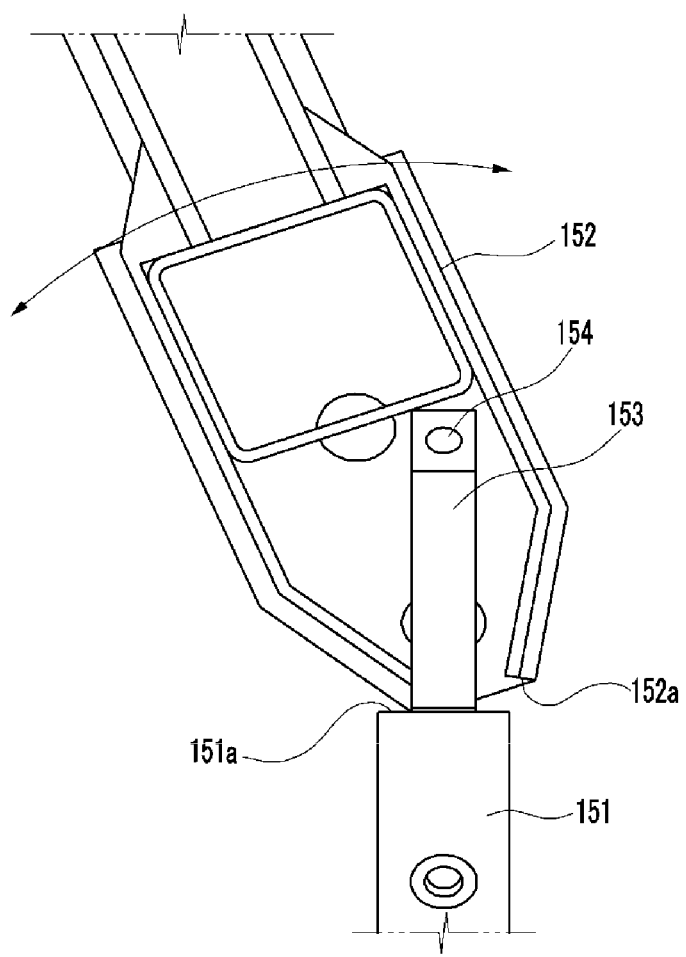
FIG. 7 is a bottom side view of an exemplary splash guard according to the present invention.

Referring to FIG. 7, the bottom of the upper splash guard 152 is connected to the top of the lower splash guard 151 so as to tilt, for example, by means of a hinge bracket 153 and a hinge pin 154.

A stopper edge 152a is formed on the bottom of the upper splash guard 152, and a horizontal stopper surface 151a is formed on the top of the lower splash guard 151. If the operator tilts the upper splash guard 152, for example, clockwise or counterclockwise, the upper splash guard 152 rotates with respect to the lower splash guard 151 by means of the hinge bracket 153 and the hinge pin 154.

If the stopper edge 152a is brought into contact with the stopper surface 151a of the lower splash guard 151 during the rotation of the upper splash guard 152, the rotation of the upper splash guard 152 is stopped, and the upper splash guard 152 remains tilted with respect to the lower splash guard 151 by the self weight of the upper splash guard 152.

Figure 8:
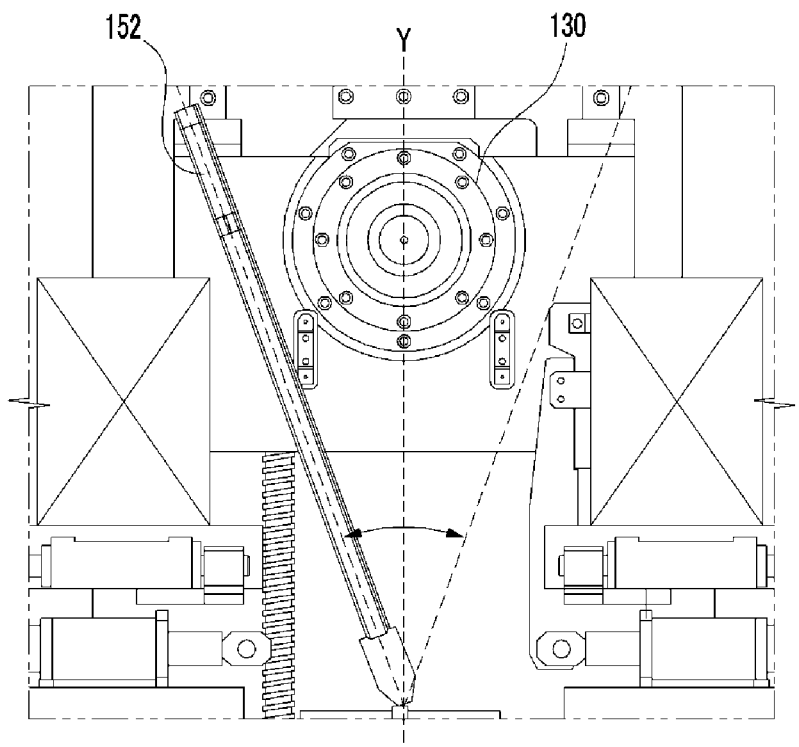
FIG. 8 is a front view of an exemplary splash guard in a tilted state according to the present invention.

Referring to FIG. 8, the upper splash guard 152 rotates clockwise on the Z-axis with respect to the lower splash guard 151, and remains tilted with respect to the Y-axis (height) of the machining center. By tilting the upper splash guard 152 with respect to the Y-axis, as stated above, a workspace for the removal or mounting of the spindle 130 is provided.

Referring back to FIG. 6, support brackets 172 for supporting the cutting oil pipe 170 are installed at upper parts of both left and right sides of the machining center to extend along the Z-axis (length) of the machining center. The upper cover 160 includes a vertical cover 164 installed at the support brackets to be rotatable, for example, by means of a hinge shaft 162 and a horizontal cover 166 bent and extended approximately or substantially at a right angle to the vertical cover 164. The hinge shaft 162 extends along the X-axis (width).

Figure 9:
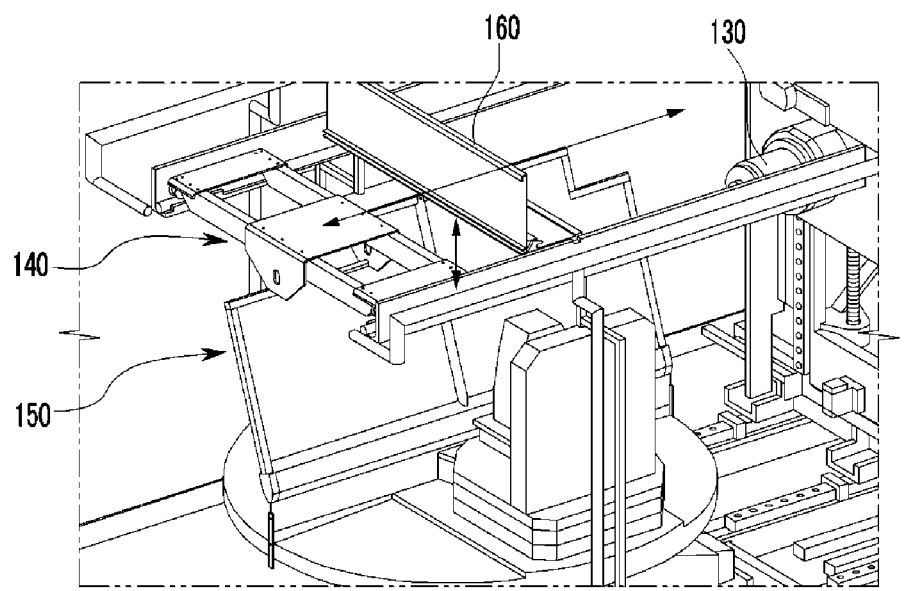
FIG. 9 is an enlarged perspective view of an exemplary splash guard in a tilted state and an upper cover in a rotated state according to the present invention.

Referring to FIG. 9, if the upper cover 160 is rotated clockwise approximately or substantially at 90 degrees on the hinge shaft 162, the horizontal cover 166 positioned horizontally in FIG. 6 rotates approximately or substantially at 90 degrees, and rises to the height of the hinge shaft 162 and stands perpendicularly as shown in the arrow.

Accordingly, the upper cover 160 does not get in the way when moving the spindle jig 140 along the cutting oil pipe 170 in the Z-axis direction as shown in the arrow.

Figure 10:
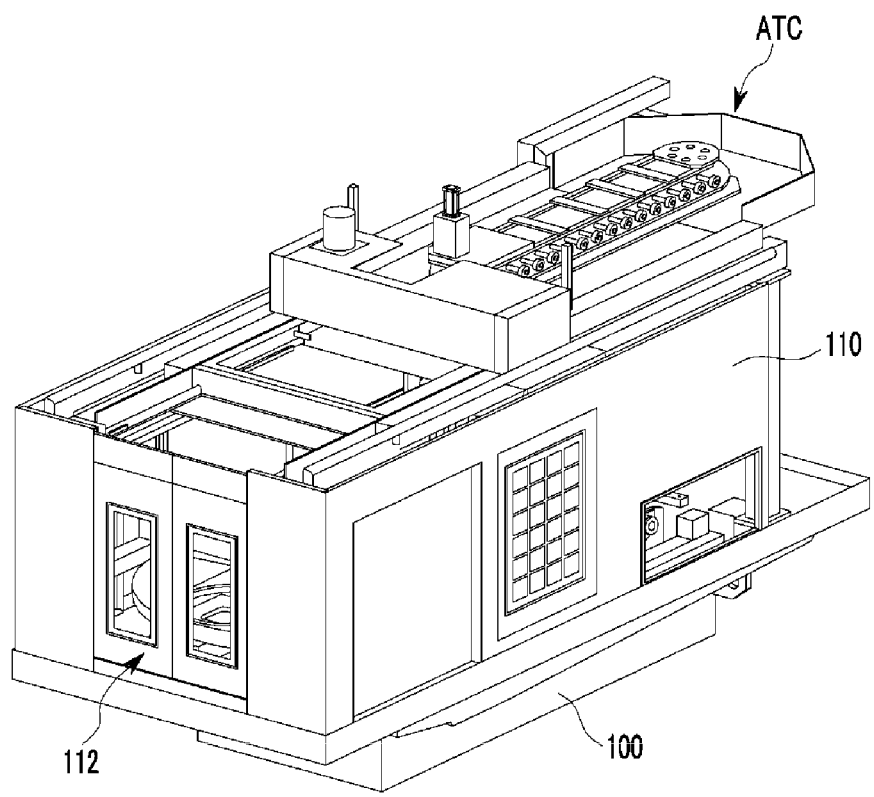
FIGS. 10 to 20 illustrates a procedure for the removal and transfer of an exemplary spindle according to the present invention.
Figure 11:
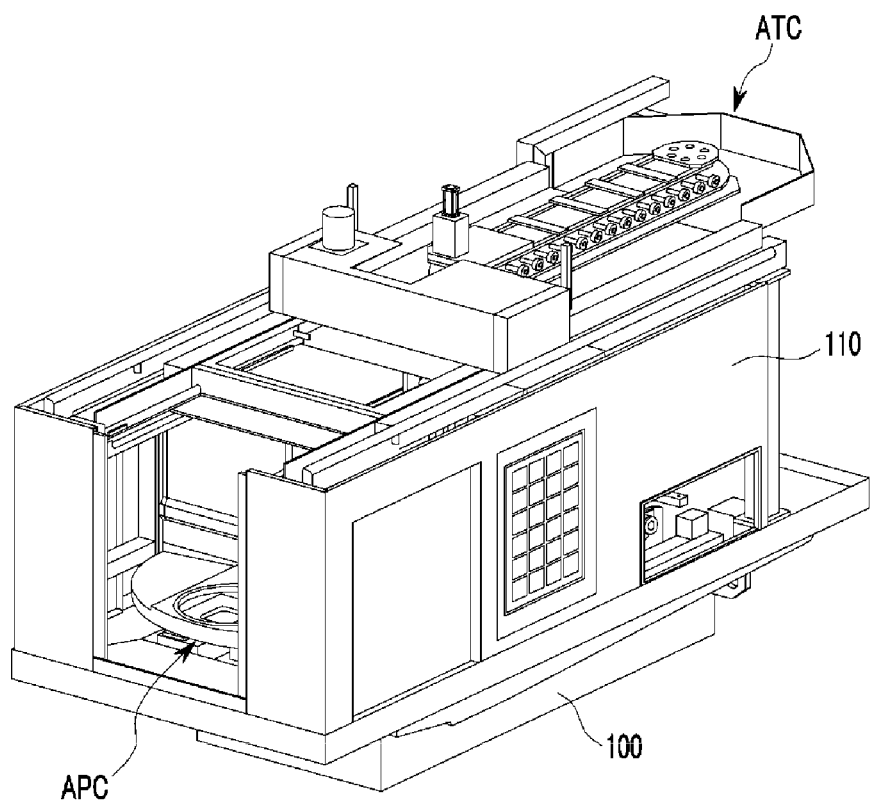

Hereinafter, a spindle removal procedure for spindle replacement will be described with reference to FIGS. 10 to 20. FIG. 10 illustrates the outer appearance of the machining center. A front cover 112 is installed on the cover 110. To replace the spindle installed within the machining center, first of all, the front door 112 is removed from the cover 110, as shown in FIG. 11.

Figure 12:
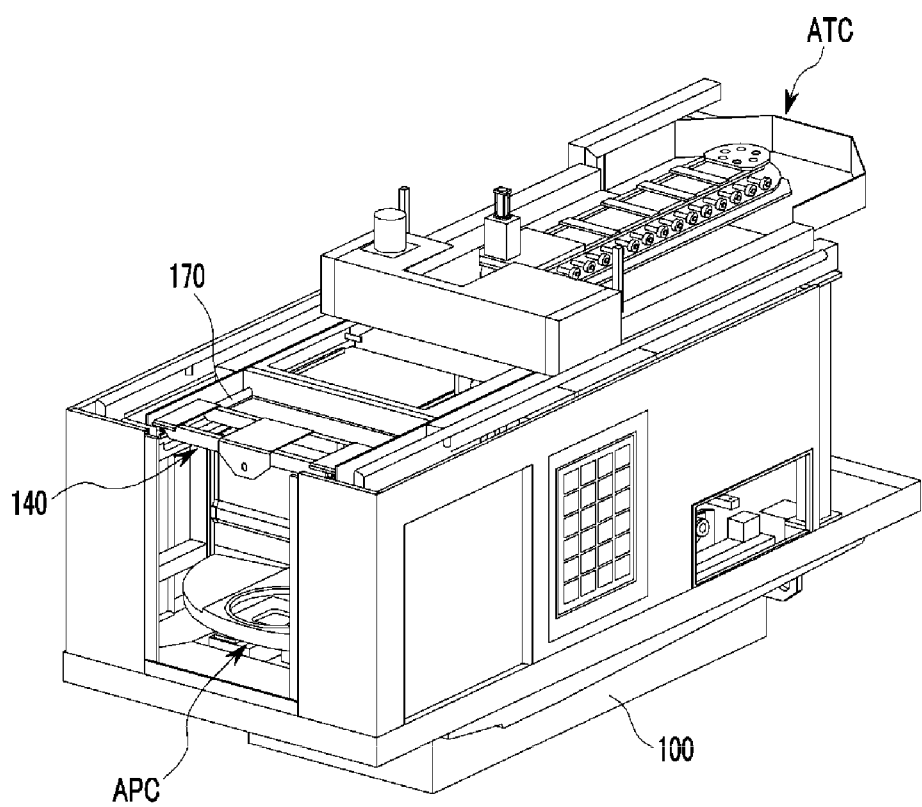

Next, the spindle jig 140 assembled as in FIG. 4 is set up over the cutting oil pipe 170, as shown in FIG. 12. The spindle jig 140 is set up so that the rollers 148 of the spindle jig 140 are situated on the cutting oil pipe 170 and roll.

Figure 13:
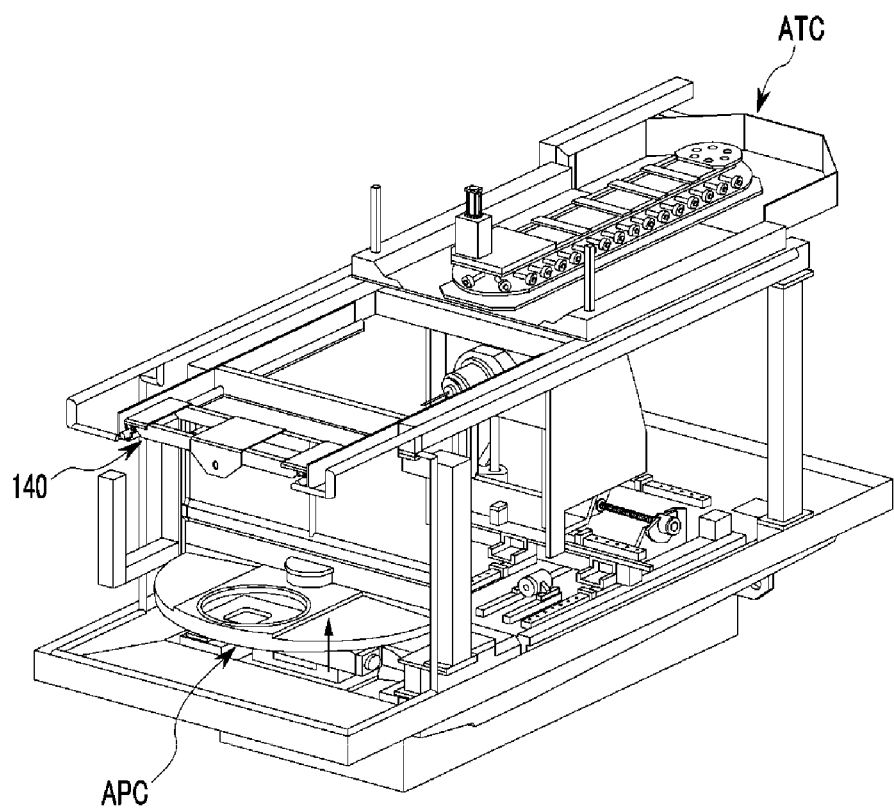
Figure 14:
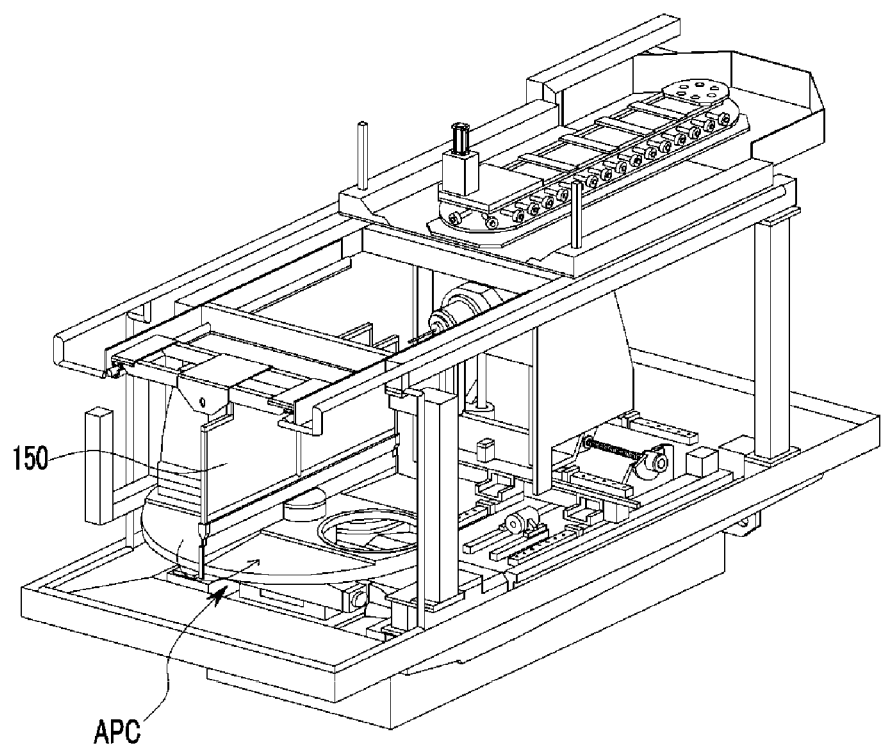

As shown in FIG. 13, the APC is lifted in the direction of the machining center. The APC may be lifted approximately 33 mm, and then rotated counterclockwise approximately or substantially at 90 degrees, as shown in FIG. 14.

Figure 15:
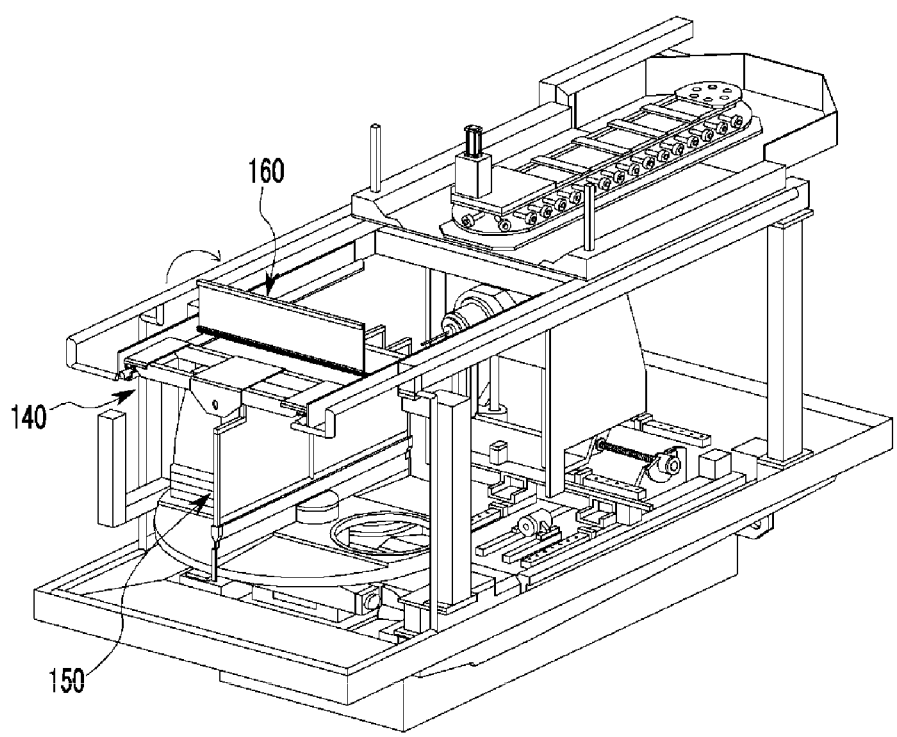

Next, as shown in FIG. 15, the upper cover 160 is rotated approximately or substantially at 90 degrees to secure a space for movement of the spindle jig 140.

Figure 16:
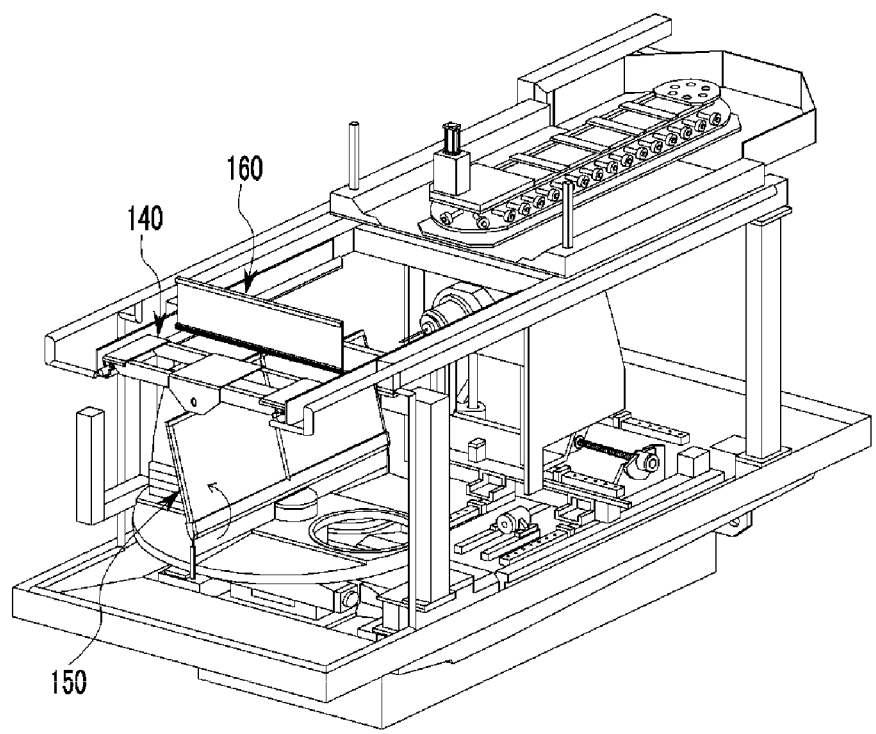

Next, as shown in FIG. 16, the splash guard 150 is tilted counterclockwise at a predetermined angle with respect to the Y-axis (height) of the machining center to secure a space for movement of the spindle jig 140. That is, as explained with reference to FIGS. 7 and 8, the upper splash guard 152 is rotated with respect to the lower splash guard 151. Alternatively, the splash guard 150 may be rotated clockwise.

Figure 17:
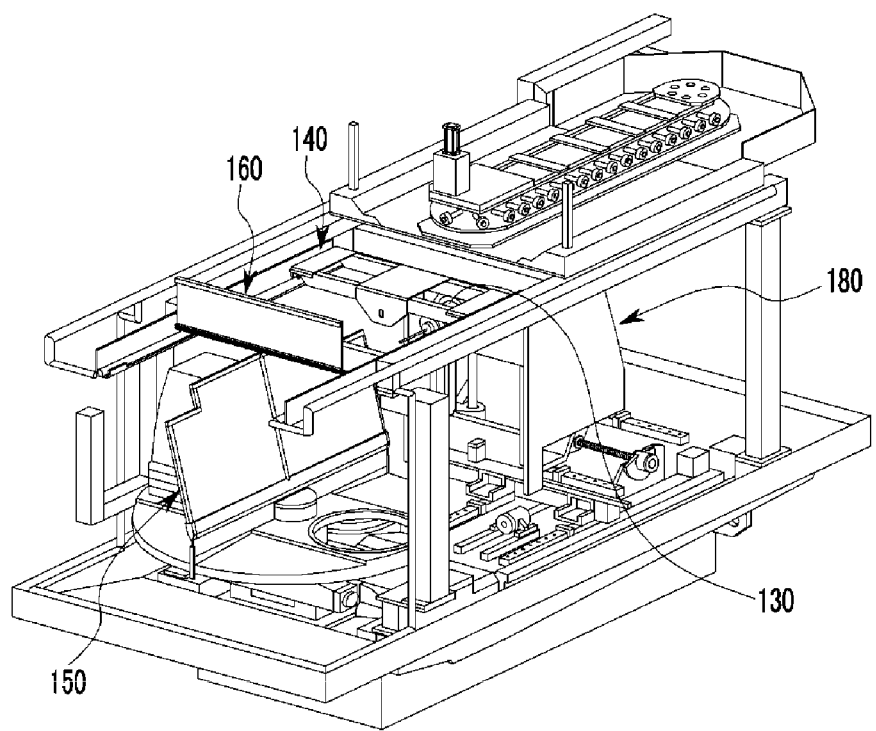

Next, as shown in FIG. 17, the spindle jig 140 is transferred to the spindle 130 mounted on the column 180 through the space for movement secured by the splash guard 150 and the upper cover 160.

Figure 18:
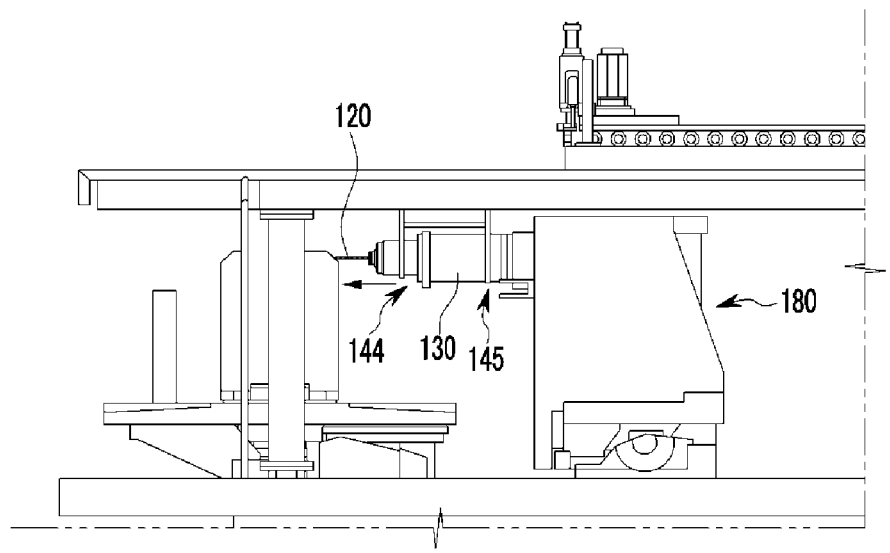

Next, as shown in FIG. 18, the jig bracket 143 of the spindle jig 140 is assembled in such a manner that the spindle 130 is fitted and supported on the first upper hook 144a and the first lower hook 144b and the spindle 130 is fitted and supported on the second upper hook 145a and the second lower hook 145b. Accordingly, the spindle 130, which in most cases is heavy, is fitted onto the two hooks 144 and 145 of the spindle jig 140, and stably supported thereon.

Figure 19:
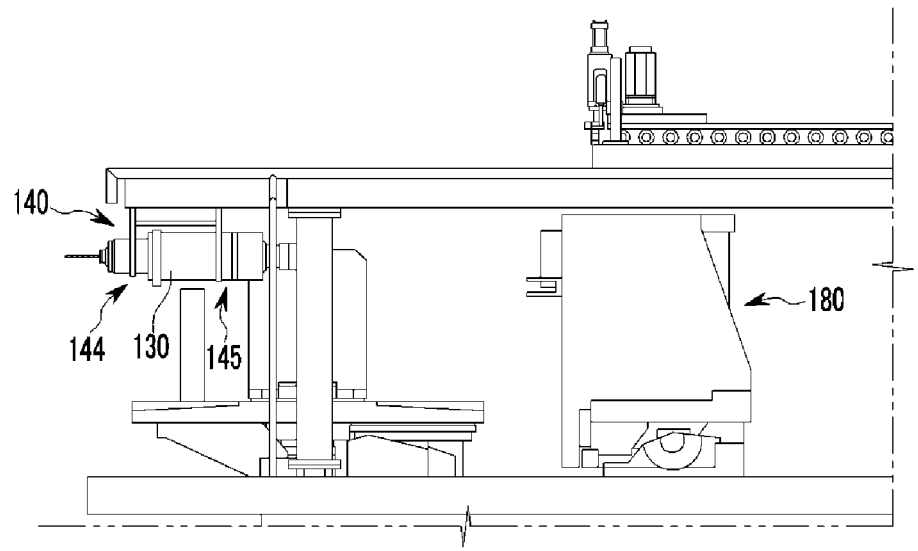
Figure 20:
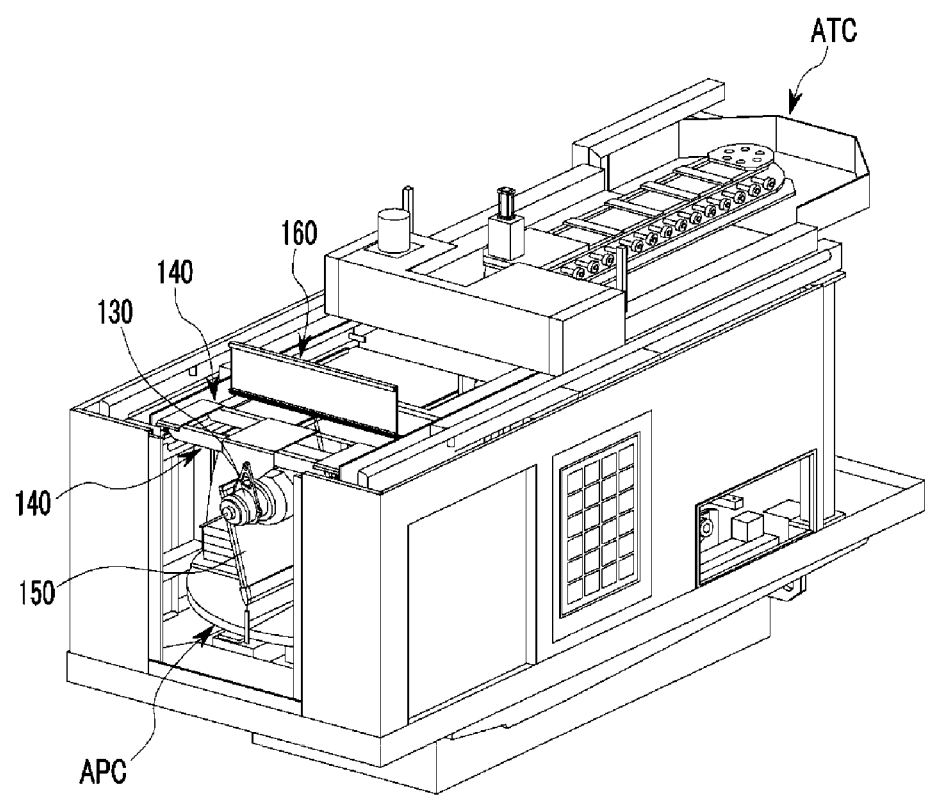

By separating the spindle 130 from the column 180 while the spindle 130 is being fitted and supported on the spindle jig 140, as stated above, and transferring the spindle jig 140 forward of the machining center in the lengthwise direction of the machining center along the cutting oil pipe 170, as shown in FIG. 19, the spindle 130, removed from the column 180, is positioned at the front door, which is removed from the machining center.

The removed spindle may be removed from the hooks 144 and 145 and replaced with another or repaired with the use of proper instruments.

Once a new or repaired spindle is mounted on the hooks in reverse order of the above procedure and transferred toward the column and mounted thereon by means of the spindle jig, and the upper cover and the splash guard are rotated to the original position, the spindle replacement requiring the removal and mounting of the spindle is completed.

For convenience in explanation and accurate definition in the appended claims, the terms "upper" or "lower", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A spindle jig comprising:
   jig frames disposed substantially parallel to each other;
   jig brackets connecting first edges of the jig frames and connecting second edges of the jig frames;
   a hook bracket that integrally connects the jig frames at a center portion along the lengthwise direction of the jig frames and extends from the jig frames;
   rollers disposed at the first edges and second edges of the jig frames;
   hooks detachably installed on the hook bracket for placing and supporting a spindle,
   wherein the hooks comprise first and second hooks,
   the first hook comprising:
      a first hook first portion, a first part thereof detachably mounted on the hook bracket, and a second part thereof having a substantially semicircular arc-shaped fitting portion; and
      a first hook second portion, disposed below the first hook first portion, which has a substantially semicircular arc shape and forms a substantially arc-shape together with the substantially semicircular arc-shaped fitting portion of the first hook first portion, and is detachably coupled to the first hook first portion; and
   the second hook comprising:
      a second hook first portion, a first part thereof detachably mounted on the hook bracket, and a second part thereof having a substantially semicircular arc-shaped fitting portion; and
      a second hook second portion, disposed below the second hook first portion, which has a substantially semicircular arc shape and forms a substantially arc-shape together with the substantially semicircular arc-shaped fitting portion of the second hook first portion, and is detachably coupled to the second hook first portion; and
      an assembly pin that is disposed to penetrate the first hook first portion and the second hook first portion, wherein assembly holes are formed in the hook bracket that penetrates the hook bracket for inserting, and holding the assembly pin.

2. A machining center comprising:
   the spindle jig of claim 1;
   a guide rail mounted to guide and move the spindle jig;
   the spindle fitted and supported on the spindle jig, and equipped with a processing tool and rotating the processing tool;
   a column on which the spindle jig is mounted;
   an auto pallet changer equipped with materials, and transferring the materials to a processing area or a non-processing area;
   a splash guard that is rotated integrally with the auto pallet exchanger, mounted to be tiltable at a predetermined angle, and separates the processing area from the non-processing area; and
   a cover installed to be rotatable on a movement path of the spindle jig along the guide rail.

3. The machining center of claim 2, wherein the guide rail comprises a cutting oil pipe for supplying a cutting oil when processing the materials by the spindle.

4. The machining center of claim 3, further comprising support brackets for supporting the cutting oil pipe, wherein the cover comprises a vertical cover rotatably installed at the support brackets by a hinge shaft, and a horizontal cover bent and extended substantially at a right angle to the vertical cover.

5. The machining center of claim 2, wherein the splash guard comprises:
   a splash guard first portion mounted on the auto pallet changer; and
   a splash guard second portion tiltably connected to the splash guard first portion.

6. The machining center of claim 5, wherein a bottom of the splash guard second portion is tiltably connected to a top of the splash guard first portion by a hinge bracket and a hinge pin.

7. The machining center of claim 6, wherein a stopper edge is formed on the bottom of the splash guard second portion, and a horizontal stopper surface is formed on the top of the splash guard first portion to prevent further tilting of the splash guard second portion when the horizontal stopper surface contacts the stopper edge.

8. A machining center comprising:
    a spindle jig, wherein the spindle jig comprises:
        jig frames disposed substantially parallel to each other;
        jig brackets connecting first edges of the jig frames and connecting second edges of the jig frames;
        a hook bracket that integrally connects the jig frames at a center portion along the lengthwise direction of the jig frames and extends from the jig frames;
        rollers disposed at the first edges and second edges of the jig frames; and
        hooks detachably installed on the hook bracket for placing and supporting a spindle;
    a guide rail mounted to guide and move the spindle jig;
    the spindle fitted and supported on the spindle jig, and equipped with a processing tool and rotating the processing tool;
    a column on which the spindle jig is mounted;
    an auto pallet changer equipped with materials, and transferring the materials to a processing area or a non-processing area;
    a splash guard that is rotated integrally with the auto pallet exchanger, mounted to be tiltable at a predetermined angle, and separates the processing area from the non-processing area; and
    a cover installed to be rotatable on a movement path of the spindle jig along the guide rail.

9. The machining center of claim 8, wherein the guide rail comprises a cutting oil pipe for supplying a cutting oil when processing the materials by the spindle.

10. The machining center of claim 9, further comprising support brackets for supporting the cutting oil pipe, wherein the cover comprises a vertical cover rotatably installed at the support brackets by a hinge shaft, and a horizontal cover bent and extended substantially at a right angle to the vertical cover.

11. The machining center of claim 8, wherein the splash guard comprises:
    a splash guard first portion mounted on the auto pallet changer; and
    a splash guard second portion tiltably connected to the splash guard first portion.

12. The machining center of claim 11, wherein a bottom of the splash guard second portion is tiltably connected to a top of the splash guard first portion by a hinge bracket and a hinge pin.

13. The machining center of claim 12, wherein a stopper edge is formed on the bottom of the splash guard second portion, and a horizontal stopper surface is formed on the top of the splash guard first portion to prevent further tilting of the splash guard second portion when the horizontal stopper surface contacts the stopper edge.

* * * * *